Figure 1:
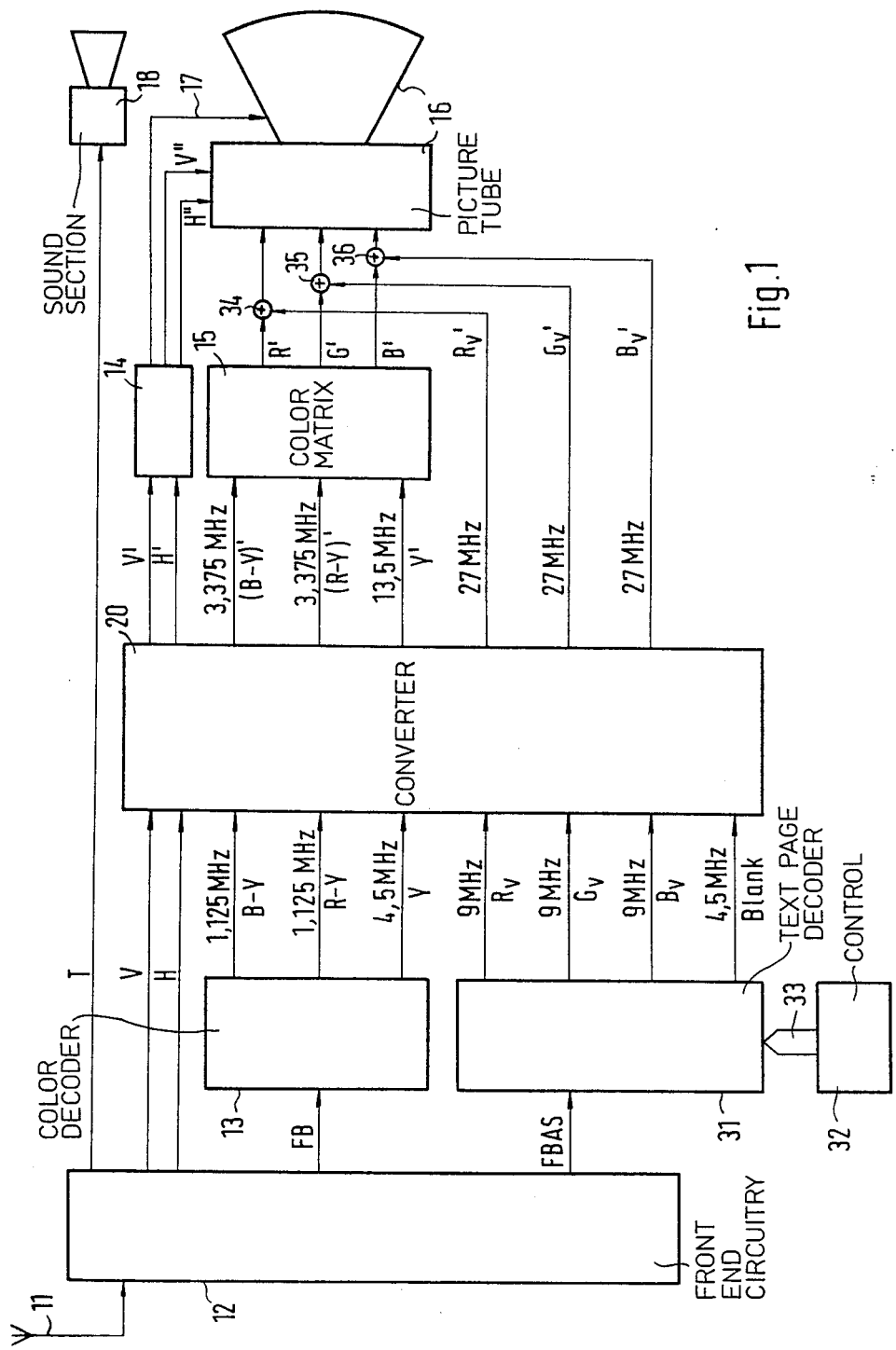

United States Patent [19]

Mitschke

[11] Patent Number: 4,518,984
[45] Date of Patent: May 21, 1985

[54] DEVICE FOR FLICKER-FREE REPRODUCTION OF TELEVISION PICTURES AND TEXT AND GRAPHICS PAGES

[75] Inventor: Helmut Mitschke, Königsbach-Stein, Fed. Rep. of Germany

[73] Assignee: International Standard Electric Corporation, New York, N.Y.

[21] Appl. No.: 471,075

[22] Filed: Mar. 1, 1983

[30] Foreign Application Priority Data

Mar. 18, 1982 [DE] Fed. Rep. of Germany ....... 3209876

[51] Int. Cl.³ .................... H04N 9/42; H04N 9/535
[52] U.S. Cl. ........................... 358/11; 358/22
[58] Field of Search ............... 358/21 R, 22, 11, 147, 358/146, 142, 140; 340/701, 721, 703, 799

[56] References Cited

U.S. PATENT DOCUMENTS 4,233,628 11/1980 Ciciora ................... 358/147

OTHER PUBLICATIONS

IEEE Transactions on Consumer Electronics, vol. CE-26, No. 3, Aug. 1980, IEEE, New York, K. E. Clarke, "The Application of Picture Coding Techniques to Viewdata", pp. 568–577.

Primary Examiner—John C. Martin
Assistant Examiner—Michael Dunnam
Attorney, Agent, or Firm—Donald J. Lenkszus

[57] ABSTRACT

As is well known, a virtually flicker-free picture is obtained by using a sufficiently high picture-reproducing frequency and doing without interlaced scanning. This is achieved with a suitable standard converter in which the picture is temporarily stored in digital form. By suitable multiplexing, the digital frame store (221, 222, 223) can also be used for the conversion of the text and graphics page. Multiplexer (26) and demultiplexer (27) are switched by a blanking signal (Blank, Blank') which is buffered in the frame store together with the associated picture section.

2 Claims, 2 Drawing Figures

DEVICE FOR FLICKER-FREE REPRODUCTION OF TELEVISION PICTURES AND TEXT AND GRAPHICS PAGES

The present invention relates to a television picture reproducer with digital frame store, wherein the video signal received from the transmitter at a given field and line frequency is sampled, and wherein the sample values are converted into digital data units, written into the frame store at a first frequency, the write frequency, read out of the frame store at a second frequency, the read frequency, which is a multiple of the write frequency, returned to analog form, and reproduced on the screen at a higher field and line frequency. By this standard conversion, a virtually flicker-free picture is obtained.

It is known, e.g., from DE-OS No. 29 15 359, that a flicker-free picture can be obtained both by increasing the picture-reproducing frequency and by doing without interlaced scanning. To this end, the received television picture is stored in digital form and read out at a higher rate or in a different sequence.

Flicker is also noticed when text and graphics pages (e.g., in Viewdata or Videotext), called "text pages" for short, are reproduced. In the Viewdata system, the flicker due to interlaced scanning is eliminated by bringing the lines of the second field and those of the first field to coincidence. However, this gives very coarse resolutions (DE-AS No. 29 49 020). In television sets containing a standard converter for flicker-free reproduction of the television picture, an idea that suggests itself is to not only convert the television picture but also superpose the text page and blank the television picture or a portion thereof already in front of the standard converter. However, this requires a different converter which must be designed for a greater bandwidth and, consequently, needs a larger (and faster) memory, for the television picture and a text page differ greatly in their technical data:

In the case of the television picture, each color and each brightness level must be reproducible. In the case of a text page, only a few colors and only one brightness level per color need to be reproduced. However, the text page must show much finer structures than the television picture. It must, therefore, be processed with a greater bandwidth.

The two cases thus differ in that in the first case (i.e., in the case of the television picture), very large, but less frequently occurring data units have to be processed, while in the latter case (i.e., in the case of the text page), the data units to be processed are smaller but occur more frequently.

The object of the invention is to meet the different requirements in the standard conversion of a television picture and a text page without having to enlarge the store required to convert the television picture.

The invention is characterized in that a television picture reproducer equipped with a frame store for standard conversion also contains a decoder for the selection and display of text and graphics pages (e.g., for Viewdata or Videotext), called "text page decoder" (31) for short, which forms at least color signals ($R_v$, $G_v$, $B_v$) and a blanking signal (Blank), that the frame store (221, 222, 223) is preceded by a multiplexer (26) which permits the (digital) color signals for the text and graphics pages, called "text pages" for short, to be stored instead of at least part of the data units for the television picture, that the data units read from the frame store are separated into text-page and television-picture signals by a demultiplexer (27), that the switchover of the multiplexer (26) and the demultiplexer (27) as well as the blanking of the respective picture or picture section not to be displayed is effected by the original or a suitably converted blanking signal (Blank), and that groups of n successive values of the color signals of the text page are simultaneously written into and simultaneously read from the frame store, for which purpose an additional multiplexer (25) with a buffer (251) and an additional demultiplexer (28) are inserted in the path of the text-page signal at the input end and the output end, respectively.

At a bandwidth of 4.5 MHz, the television picture is sufficiently resolved. To reproduce text pages, about 6–7 MHz are necessary, for n=2, a sufficient bandwidth of 9 MHz is obtained.

In some text-page transmission systems, such as the Videotext system, texts can also be superposed on the screen. To do this, only part of the television picture is blanked by the blanking signal and replaced with a portion of a text page. The blanking signal must then be converted in the same manner as the picture content. This is achieved by storing the blanking signal, too, and using the blanking signal recovered at the output of the frame store to switch over the demultiplexer and blank the respective picture section not to be displayed.

Figure 2:
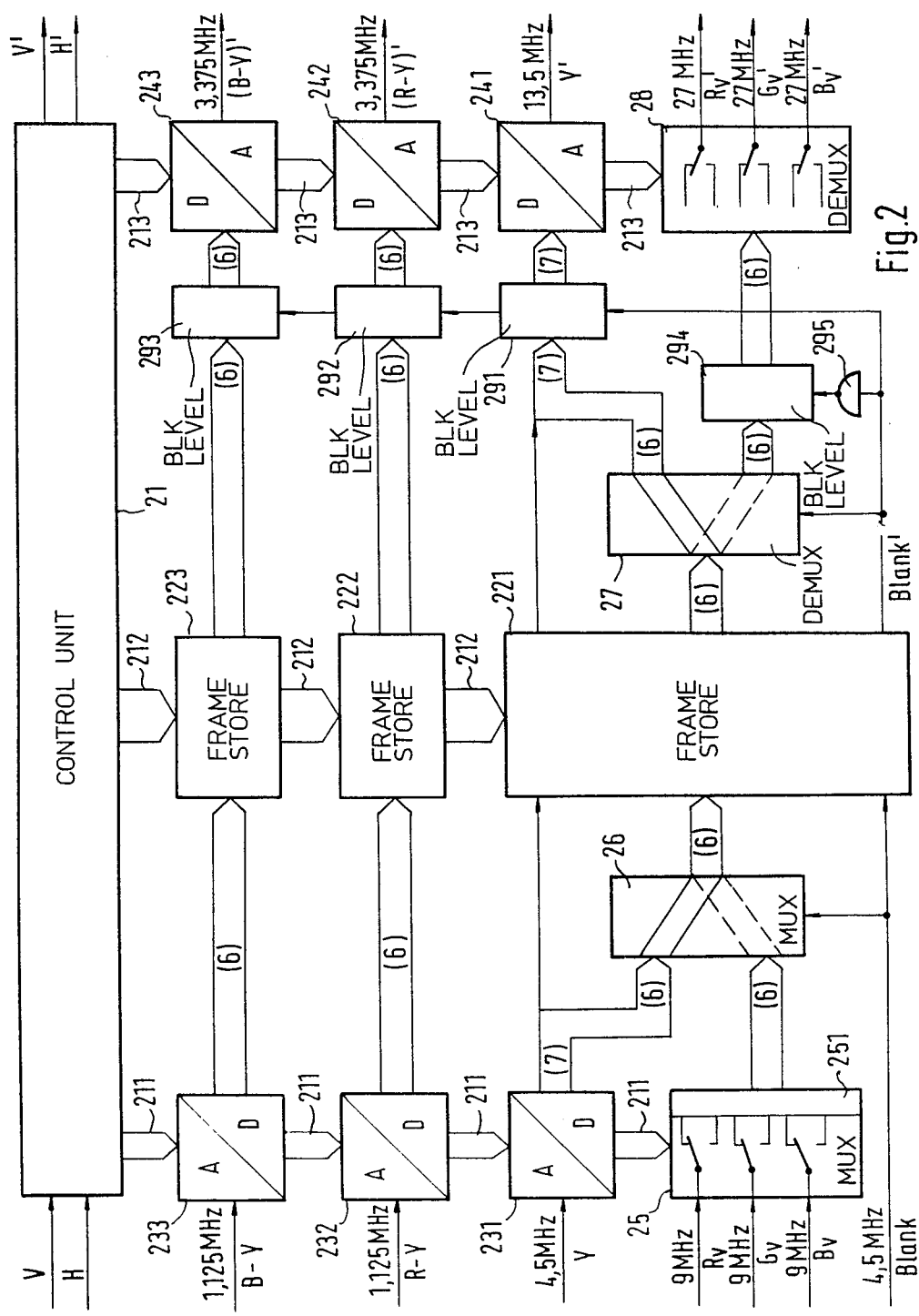

The invention will now be explained in more detail with reference to the accompanying drawings, in which:

FIG. 1 is a block diagram of an embodiment of a television picture reproducer in accordance with the invention, and FIG. 2 is a block diagram of an embodiment of the standard converter 20 of FIG. 1.

In FIG. 1, the subassemblies 11 . . . 18 represent a conventional color-television receiver, the possible designs of which are known to the smallest details.

The signal path is as follows:

In a front end 12 and a color decoder 13, the television signal from a signal source e.g., an antenna 11, is separated into a sound signal T, vertical pulses V and horizontal pulses H, a luminance signal Y, and the color-difference signals R-Y and B-Y. A color matrix 15 transforms the luminance signal and the color-difference signals into the red, green, and blue signals (color signals) which are used to drive a color-picture tube 16. A deflection circuit 14 derives the vertical and horizontal deflection voltages V" and H" and the high voltage 17 for the color picture tube 16 from the vertical and horizontal pulses. A sound section 18 reproduces the sound signal T.

To obtain a flicker-free television picture, the standard converter 20 has been inserted. It converts the interlaced television pictures received at a frame rate of 25 Hz into noninterlaced television pictures with a frame rate of 75 Hz. If the Videotext facility consisting of the subassemblies 31 . . . 36, or another type of text-page facility, is not present, the standard converter may be constructed as shown in FIG. 4 of DE-OS No. 29 15 359 and described in the pertinent passage of the specification.

For the reproduction of text pages, a text-page decoder 31 is inserted which, e.g., in Videotext, needs the entire video signal FBAS, while the color decoder 13 processes only the picture content FB. A control 32 is connected to the text-page decoder 31 through a transmission channel 33, which may also be a conventional infrared or ultrasonic link.

For other text-page transmission systems, such as Viewdata, the subassemblies 31 . . . 33 must be modified in a suitable manner. The blanking signal Blank may be produced in a simple manner by the television-picture/text-page switch forming part of the control 32.

To ensure sufficient resolution, certain minimum bandwidths are required for the individual signals. In the example, also with regard to the further processing of the signals, the following bandwidths have been chosen (lower band limit=0 Hz):

4.5 MHz for the luminance signal Y, 1.125 MHz for each of the color-difference signals R-Y and B-Y, 9 MHz for each of the color signals delivered by the text-page decoder, i.e., $R_v$, $G_v$, $B_v$, and 4.5 MHz for the blanking signal Blank.

If 25 frames per second are converted to 75 frames per second, the converted signals Y', (R-Y)', (B-Y)', $R_v'$, $G_v'$, $B_v'$, and Blank' each have three times the bandwidth of the original signal.

The horizontal and vertical pulses H and V are provided by the front end 12. The repetition rate of H' is three times that of H, while the repetition rate of V' is only one and a half times that of V because there is no interlace.

The converted color signals of the text page, $R_v'$, $G_v'$, and $B_v'$, and the color signals of the television picture which are provided by the color matrix 15, i.e., R', G', and B', are combined in adders 34, 35, and 36 and applied to the color-picture tube 16. The video output stages, which must process frequencies up to 27 MHz, are not shown.

The operation of the standard converter 20 will now be described with the aid of FIG. 2. A control unit 21 controls the entire conversion process over control lines consisting of groups 211, 212, and 213; it is synchronized by vertical and horizontal pulses V and H, which it converts into the pulses V' and H'.

The luminance signal and the color-difference signals are digitized separately in analog-to-digital converters 231-233, buffered in digital frame stores 221-223, and then returned to analog form in digital-to-analog converters 241-243. In the example, the color-difference signals are each represented by 6-digit binary numbers, while the luminance signal is represented by 7-digit binary numbers.

The color signals of the text page, $R_v$, $G_v$, and $B_v$, are converted from a 9-MHz data stream consisting of 3-bit binary words into a 4.5 MHz data stream consisting of 6-bit binary words in a multiplexer 25 followed by a buffer 251. This 4.5-MHz data stream thus has the same properties as any 6 of the 7 digits of the digitized luminance signal. Since only either a text page or a television picture has to be displayed, switchover is effected in a multiplexer 26 such that either the 6 outputs of the buffer 251 or 6 of the 7 outputs of the analog-to-digital converter 231 are connected to the input of the frame store 221. The seventh output of the converter 231 is permanently connected to the input of the frame store 221.

The switchover of the multiplexer 26 is effected by the blanking signal Blank.

At the output of the frame store 221, the data streams must be separated into those for the television picture and those for the text page. This is done in the demultiplexer 27, which is switched by an additional blanking signal Blank'. In the simplest case, the two blanking signals will be identical, and will be preset by the user at the television-picture/text-page switch in the control 32.

If texts are to be superposed on the screen, however, only parts of the picture will be switched over. The blanking signal Blank must then be stored in the frame store 221 and recovered, together with the associated portion of the picture information, as a blanking signal Blank'.

A demultiplexer 28 changes every 6 simultaneously arriving color values back to the original two successive groups of three color values each (as are received by the multiplexer 25); however, they now arrive three times as fast. Here a digital-to-analog converter, just as an analog-to-digital converter at the input, can be dispensed with, because in the case of text pages the analog signals can assume only two values, so that analog and digital signals are identical.

As no switchover takes place between the color signals of the television picture and the text page, but these signals are only added in the adders 34–36, either of the two color-signal groups R', G', B' and $R_v'$, $G_v'$, $B_v'$ must be zero. This is accomplished with black-level-inserting devices 291 . . . 294, each of which sets the value 0 digitally. They may be contained in the converters 241-243, in which case they are activated via the reset inputs, and they must also form part of the demultiplexer 27, in which case the disabled outputs are grounded. In the latter case, no separate control is necessary; otherwise the control must be effected for the television picture by the blanking signal Blank', and for the text page by the signal inverted from the blanking signal Blank' in an inverter 295.

I claim:

1. Television picture reproducer with digital frame store, wherein the video signal received from the transmitter at a given field and line frequency is sampled, and wherein the sample values are converted into digital data units, written into the frame store at a first frequency, the write frequency, read out of the frame store at a second frequency, the read frequency, which is a multiple of the write frequency, returned to analog form, and reproduced on the screen at a higher field and line frequency, characterized in that the reproducer contains a decoder for the selection and display of text and graphics pages (e.g., for Viewdata or Videotext), called "text-page decoder" (31) for short, which forms at least color signals ($R_v$, $G_v$, $B_v$) and a blanking signal (Blank), that the frame store (221, 222, 223) is preceded by a multiplexer (26) which permits the (digital) color signals for the text and graphics pages, called "text pages" for short, to be stored instead of at least part of the data units for the television picture, that the data units read from the frame store are separated into text-page and television-picture signals by a demultiplexer (27), that the switchover of the multiplexer (26) and the demultiplexer (27) as well as the blanking of the respective picture or picture section not to be displayed is effected by the original or a suitably converted blanking signal (Blank), and that groups of n successive values of the color signals of the text page are simultaneously written into and simultaneously read from the frame store, for which purpose an additional multiplexer (25) with a buffer (251) and an additional demultiplexer (28) are inserted in the path of the text-page signal at the input end and the output end, respectively.

2. A television picture reproducer as claimed in claim 1, characterized in that the blanking signal (Blank) is stored as well, and that the blanking signal (Blank') recovered at the output of the frame store and, thus, converted in accordance with the picture content is used to switch over the demultiplexer (27) and to blank the respective picture section not to be displayed.

* * * * *